(12) United States Patent
Vincent

(10) Patent No.: US 8,428,087 B1
(45) Date of Patent: Apr. 23, 2013

(54) FRAMEWORK FOR STATELESS PACKET TUNNELING

(75) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 236 days.

(21) Appl. No.: 12/885,258

(22) Filed: Sep. 17, 2010

(51) Int. Cl.
*H04J 3/24* (2006.01)
*G06F 15/16* (2006.01)

(52) U.S. Cl.
USPC .......................................... 370/474; 709/236

(58) Field of Classification Search .................. None
See application file for complete search history.

(56) References Cited

U.S. PATENT DOCUMENTS

| | | | | |
|---|---|---|---|---|
| 5,539,736 A * | 7/1996 | Johnson et al. | ............... | 370/402 |
| 6,301,229 B1 * | 10/2001 | Araujo et al. | ................. | 370/252 |
| 7,031,322 B1 * | 4/2006 | Matsuo | ....................... | 370/395.4 |
| 7,260,650 B1 * | 8/2007 | Lueckenhoff | ................ | 709/246 |
| 7,802,000 B1 * | 9/2010 | Huang et al. | .................. | 709/228 |
| 2004/0199660 A1 * | 10/2004 | Liu | ............................... | 709/236 |
| 2005/0243834 A1 * | 11/2005 | Fukuda | ...................... | 370/395.1 |
| 2006/0218390 A1 * | 9/2006 | Loughran et al. | ............. | 713/151 |
| 2009/0238209 A1 * | 9/2009 | Ju | ................................. | 370/473 |
| 2009/0249059 A1 * | 10/2009 | Asano | ........................... | 713/150 |
| 2012/0250686 A1 * | 10/2012 | Vincent et al. | ................ | 370/392 |

* cited by examiner

*Primary Examiner* — Timothy J Weidner
(74) *Attorney, Agent, or Firm* — Novak Druce Connolly Bove + Quigg LLP

(57) ABSTRACT

A framework can be utilized with conventional networking components to enable those components to process packets of specific formats using conventional algorithms, such as algorithms for receive side coalescing (RCS) and TCP segmentation offloading (TSO). Format and flow information can be added to an opaque field or other portion of a packet, at an appropriate location or pre-configured offset. Placing information at a specific location or offset enables the networking hardware to quickly recognize a packet for processing. Packets can be segmented and coalesced using conventional algorithms on the networking hardware, enabling packets of various formats to be able to take advantage of various performance enhancements.

24 Claims, 7 Drawing Sheets

FRAMEWORK FOR STATELESS PACKET TUNNELING

BACKGROUND

As an increasing number of applications and services are being made available over networks such as the Internet, and as an increasing amount of data is being stored remotely, an increasing number of content, application, and/or service providers are turning to centralized or shared resource technologies, such as cloud computing and data warehousing. As the amount of traffic increases, there is a need to increase the capacity of these shared resources and also improve the efficiency of data transmission.

Existing network components rely on established protocols, such as the transmission control protocol (TCP) or user datagram protocol (UDP), to manage traffic across the network. In order to improve efficiency and expand the capabilities of the network, as well as for other such reasons, certain entities utilize proprietary, open source, or other specific protocols, such as the generic routing encapsulation (GRE) protocol. Oftentimes these protocols alter the header or other information about data packets to be routed across the network, which prevents conventional network components such as a network interface card (NIC) from recognizing and properly handling the packets. Further, components such as NICs provide functionality that improves performance, but proprietary protocols currently cannot take advantage of these improvements without expensive custom hardware.

BRIEF DESCRIPTION OF THE DRAWINGS

Various embodiments in accordance with the present disclosure will be described with reference to the drawings, in which.

DETAILED DESCRIPTION

Figure 1:
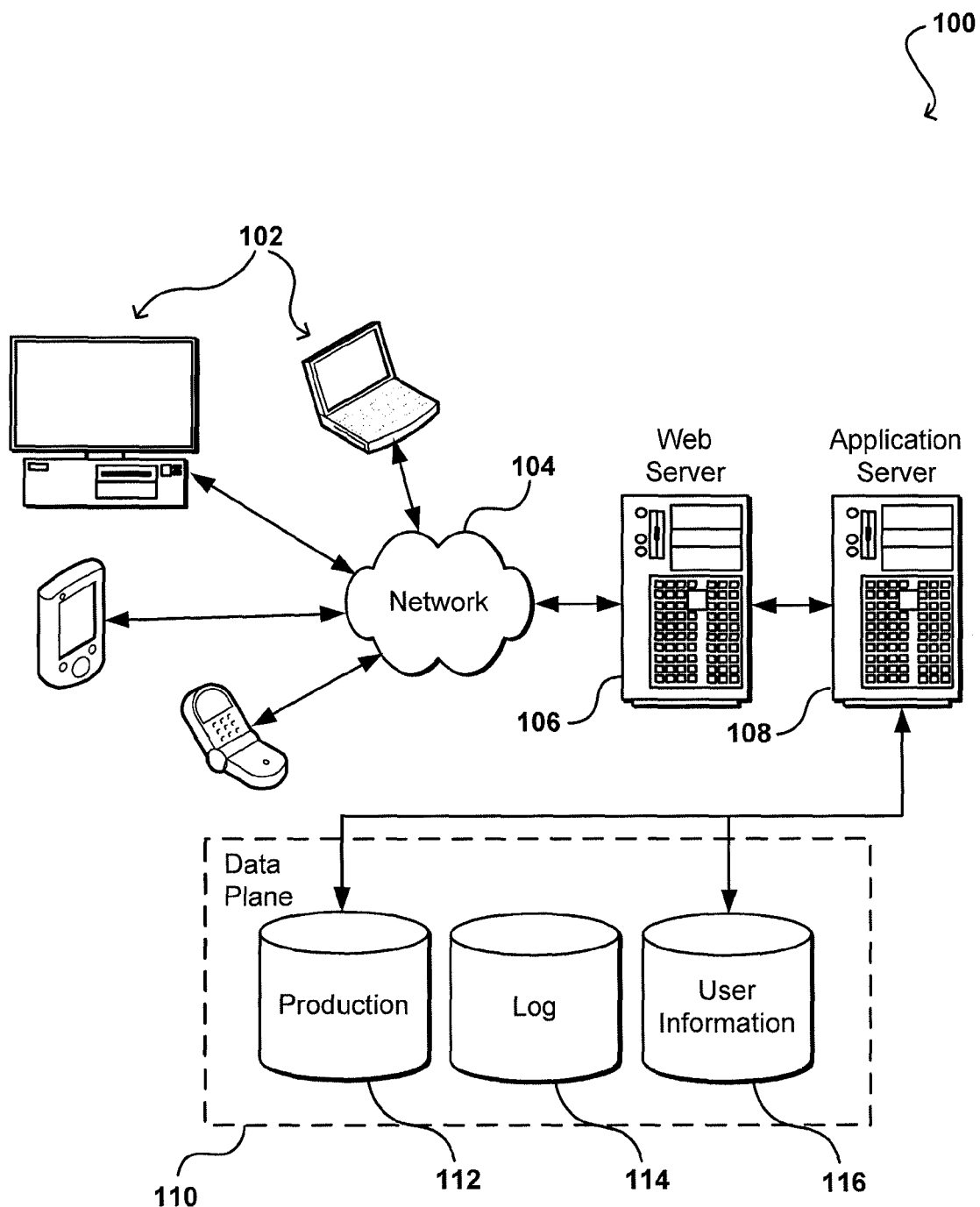
FIG. 1 illustrates an environment in which various embodiments can be implemented.

Systems and methods in accordance with various embodiments of the present disclosure may overcome one or more of the aforementioned and other deficiencies experienced in conventional approaches to managing data in a networked environment. In particular, various embodiments provide a framework for mapping any of a variety of stateless tunneling protocols, or other such protocols, to segmentation offload mechanisms and other functionality provided by commodity networking hardware. The ability to handle packets of varying format enables hardware devices to support many different types of customer traffic, as well as to provide flexibility for supporting future or additional protocols without the need for expensive hardware upgrades.

In one embodiment, a framework supports functionality offered by networking hardware such as network interface cards (NICs) and other networking or edge devices. An example framework includes a mechanism to identify a tunneled packet, as well as a mechanism to properly segment tunneled packets using "generic" information that is pre-configured. An example framework also can include a mechanism to identify the connections for various tunneled packets, as well as a mechanism to coalesce packets using general information that is configurable. In one embodiment, a framework can support tunneling protocols such as the generic routing encapsulation (GRE) protocol.

Such frameworks can enable conventional networking hardware devices to support advanced features such as TCP segmentation offloading (TSO) and Receive Side Coalescing (RSC) in conjunction with proprietary stateless tunnels used for creation of virtual overlay networks. Conventional TSO/RSC mechanisms do not otherwise support stateless tunnels such as GRE, and a framework as described herein can enable NIC vendors to support multiple types of stateless tunnels with a flexible design. NIC vendors also can implement a framework for mapping stateless tunnel protocols to the TSO/RSC mechanisms without having to worry about exact mechanics around the specific protocol implementation, effectively enabling vendors to support proprietary protocols without having to know the details of those protocols.

In various embodiments, data packets such as TCP packets are formatted with additional information in the header. While TCP is used for purposes of example, it should be understood that any appropriate protocol in the class of connection-oriented protocols amenable to segmentation can be used as well within the scope of the various embodiments as appropriate. The additional information can include an opaque field positioned between inner and outer IP headers, for example. The opaque field can include, at a specified location or offset, a field of information identifying the format or protocol of the packet. For example, there can be a field of a specified number of bytes in length (e.g., two bytes, although more or fewer bytes can be used in other embodiments) at a specified offset in the opaque header that identify the tunneling protocol used for the packet. Since routers and other network devices typically route packets to the appropriate destination using the outer IP header, the inner IP header and TCP header can be used to dictate most of the flow information. Processes such as TSO and RSC primarily work off the inner IP header and TCP header. The opaque field can, in some examples, have a fixed size in the packet header, with the length being pre-configured. In other examples or embodiments, the opaque fields can be of a variable size, such as where the first byte in the opaque field specifies the length of the opaque field. A combination of a specific pre-configured "protocol" in the outer IP header and an n-byte field in the opaque field can uniquely identify the packet as being formatted with a specific format. The offset of the n-byte field from the start of opaque field, as well as the value of the n-byte field, can be pre-configured.

When performing TSO, a hardware device can first identify the format of the packet using the pre-configured values, and once identified can apply regular TSO operations to the original segments. As part of the process, the opaque field can be replicated to each of the segments. Any necessary adjustments to the inner and/or outer IP headers (or other such fields) can be made in order to account for the opaque field.

When performing RSC, the segments (or frames) can be identified using the same pre-configured values, and the connection for each packet determined using pre-configured information in the opaque field. Conventional methodology can be used to coalesce the segments, except that the opaque fields can be thrown out for all but the first segment received for a connection. Appropriate adjustments also can be made to the inner and outer IP header as discussed herein.

Various other functionality can be provided for these and other protocols and purposes within the scope of the various embodiments as described and suggested elsewhere herein, and as would be apparent to one of ordinary skill in the art reading the same.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

A shared resource management system can include at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
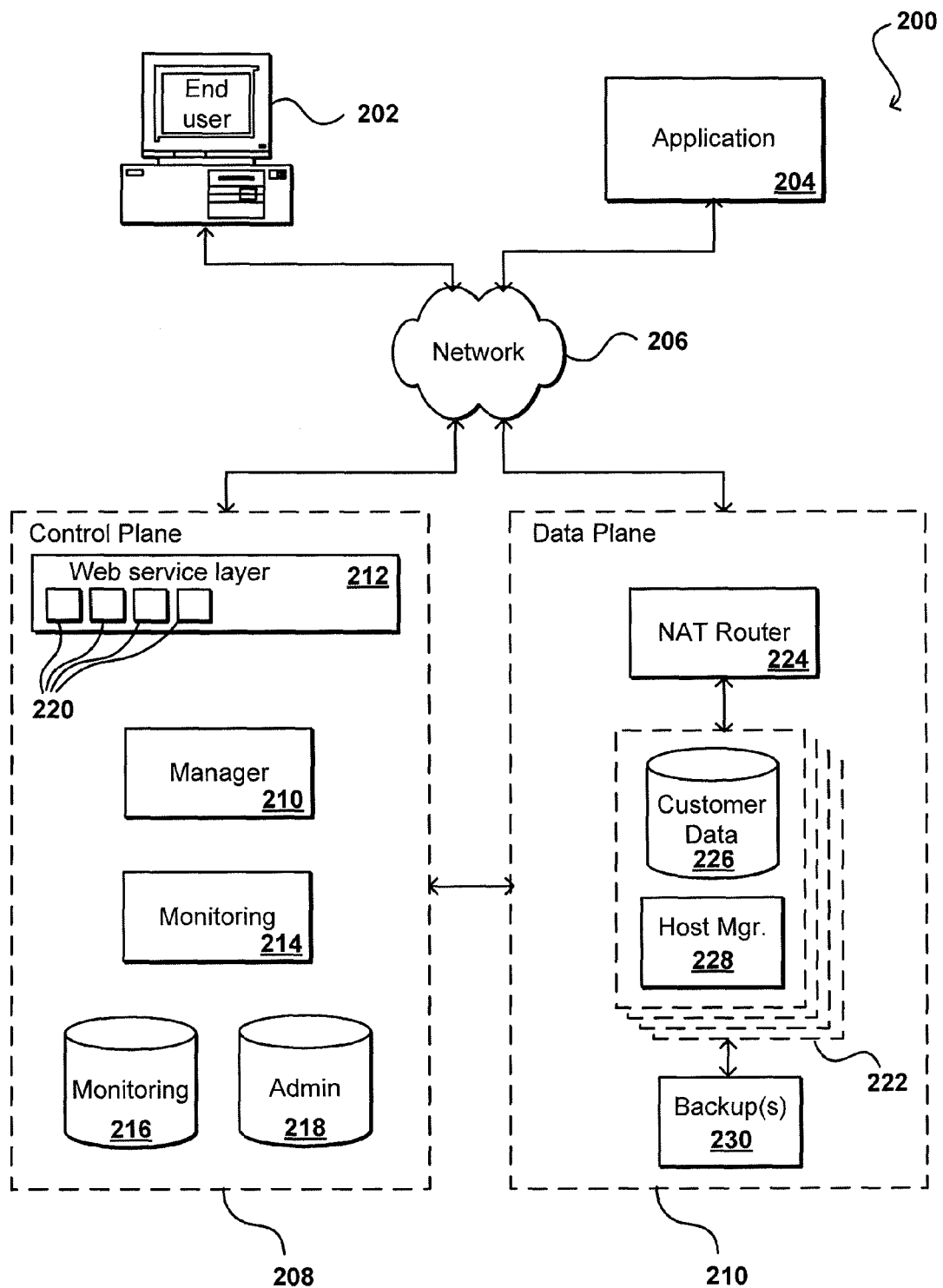
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching an IP address (derived from DNS mappings) or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port address to be used to access a resource. A user then can access the resource directly using the IP address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Figure 3:
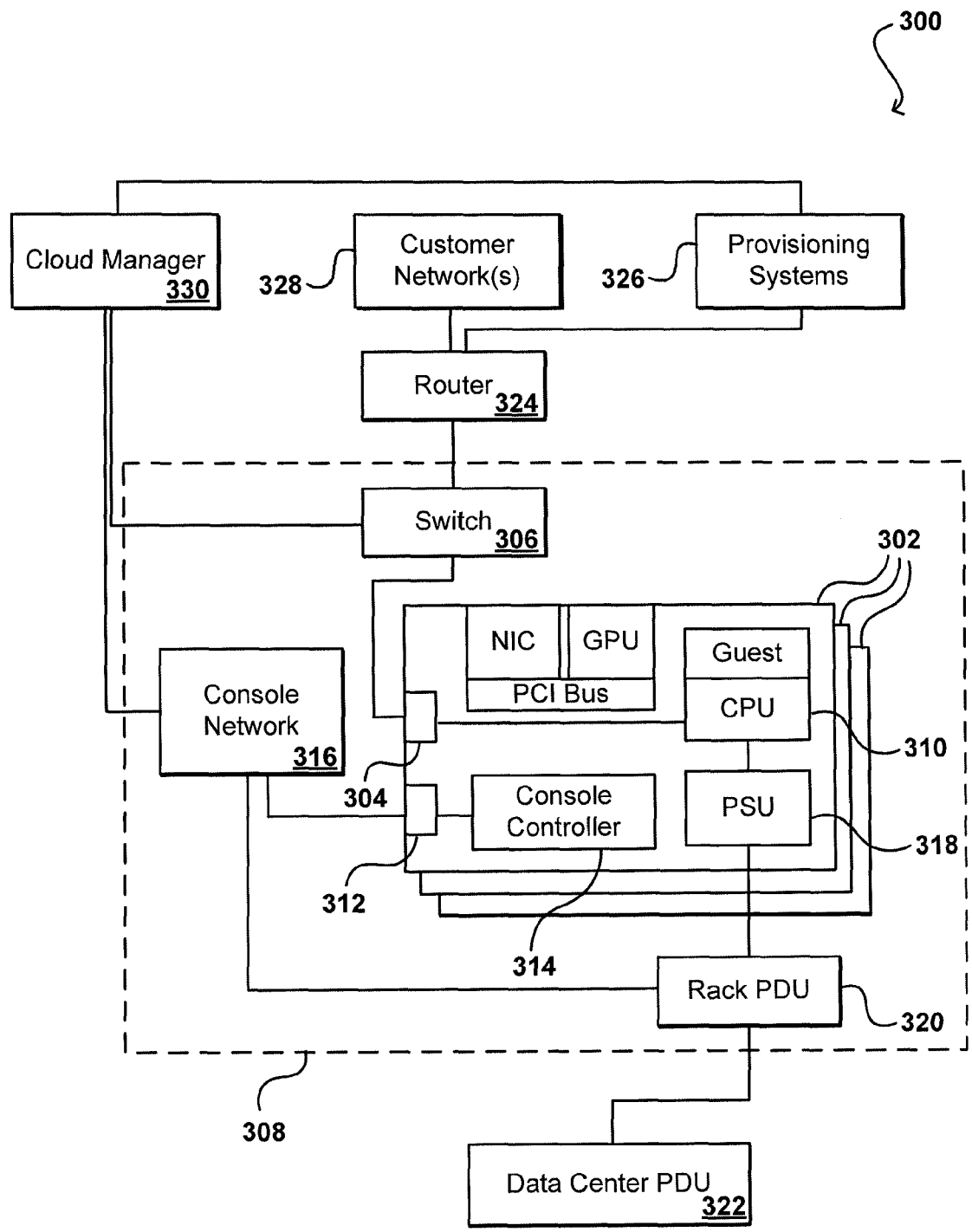
FIG. 3 illustrates a configuration for routing network traffic using specific hardware resources that can be used in accordance with one embodiment.

FIG. 3 illustrates an example of a configuration 300 that can be used to provide a customer with access to a resource in a shared environment. This example configuration includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management. In some embodiments, the cloud manager 330 or a similar component or system can manage the distribution of mapping information to the various components. In one example, the cloud manager can communicate with a NIC to update configuration or functionality of the NIC, such as to enable the NIC to process certain types of packets.

In an environment where different physical servers may be used to host customers at different times, it can be desirable to provide a level of abstraction for a user or customer network to avoid dependencies on resource allocations that can change over time. Virtual network equipment presentation such as customer network routers and customer network firewalls can also be achieved using overlay networking technology. For example, a customer's virtual local network or other virtual network between multiple computing nodes may be provided in at least some embodiments by creating an overlay network over one or more intermediate physical networks separating the multiple computing nodes. The overlay network may be implemented in various ways in various embodiments, such as by encapsulating communications and embedding virtual network address information for a virtual network in a larger physical network address space used for a networking protocol of the one or more intermediate physical networks. This allows customers to utilize a standardized address space for addressing resources in the customer network. By utilizing a standardized address space, a customer can create a "virtual" or overlay network that can use common base addresses, sub-networks, etc., without the restrictions that the substrate network places on the physical address space.

Various systems can provide for the processing of packets between a first address space, such as a customer or virtual address space, and a second address space, such as a cloud network provider or physical address space. Features such as segmentation and de-segmentation offload features of commodity devices, such as network interface cards (NICs), can be used to help reduce the overhead related to network traffic, particularly as it relates to a virtualized environment. Virtual and/or physical address and protocol information can be added to the received packets, such as to an extension portion of a transmission control protocol (TCP) or user datagram protocol (UDP). The payload portion of the segment is not modified before routing and/or further transmission.

Using virtualization, a number of virtual machine instances can be generated that appear and function to a user as being a part of the customer network, but that are mapped to actual servers or other physical resources in a separate or remote cloud, network, etc. As discussed, using a standardized address space can require the building and maintaining of a mapping between the physical substrate addresses and the virtual overlay addresses that are used for the customer address space. In some existing approaches, a central processing unit running on a host device can control the mapping of the virtual and physical addresses, such that a request received from a customer can be directed to the appropriate resource. This can take the form of data packet encapsulation and decapsulation, for example, wherein the physical address and/or header information can "co-exist" at various times with the virtual address and/or header information, such that a packet can be addressed to the virtual address by a source on the customer network, but can be properly routed to the appropriate physical address by adding the physical header information when in the cloud or remote network infrastructure.

Figure 4A:
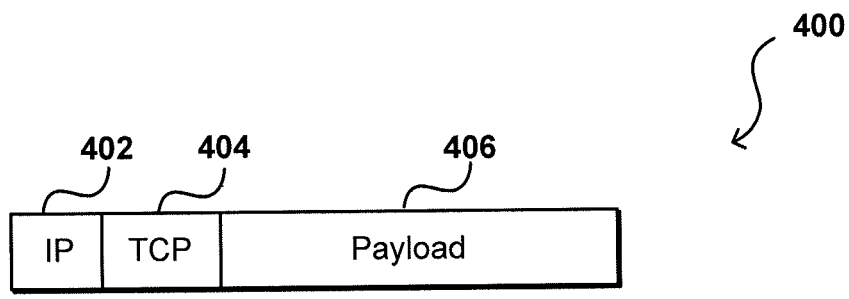
FIGS. 4(a)-4(c) illustrate a packet encapsulation and/or framing options that can be used in accordance with various embodiments.
Figure 4B:
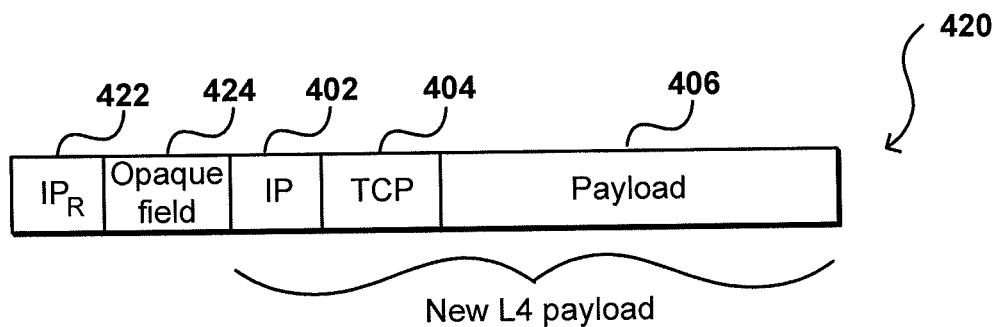
Figure 4C:
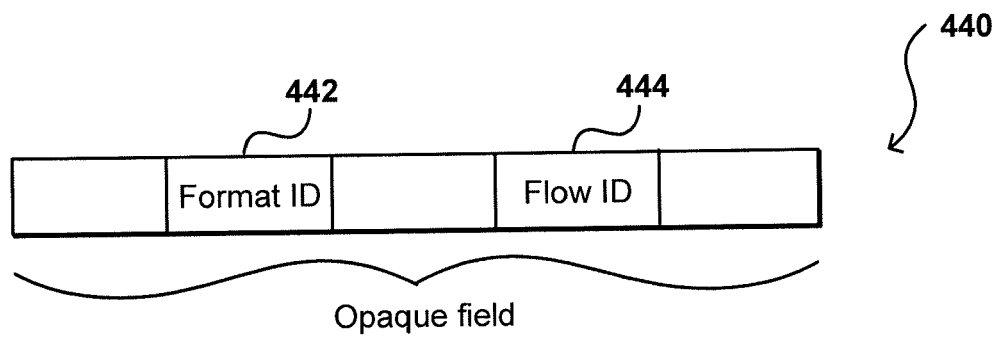

For example, FIGS. 4(a)-4(c) illustrates an example wherein a packet 400 received from a customer or "overlay" network can be encapsulated in order to be routed within a physical substrate network on which the virtual cloud environment is hosted, while enabling the packets to be processed using a framework on standard networking hardware in accordance with various embodiments. In this example, a customer packet 400 received from the virtual cloud environment includes three main parts: a virtual address 402 (such as a "virtual IP address" relevant to the customer overlay network, here denoted "IP$_v$"), a protocol header 404 (such as an original transmission control protocol header as found in the Internet Protocol suite, here denoted "TCP$_o$"), and a data or "payload" portion 406. The virtual IP address can be an address relevant only to the customer or overlay network. In order to properly route the packet to the intended destination host, this packet can be encapsulated to include an "external" data structure or frame that can route the packet within the substrate network or cloud or other such grouping of resources. In this example, the encapsulation process is shown to produce a "substrate" packet or datagram 420, as illustrated in FIG. 4(b), which includes the IP$_v$, TCP$_o$, and payload of the original customer packet, but has appended thereto additional "header" information, here including a physical or "real" address 422 (such as the IP address or "IP$_R$" within the substrate network of the cloud) and an opaque field 424, which can include information enabling the field to function as a control header or protocol header useful by the control plane to process and/or route the encapsulated packet. Without the appending any of this "real" information, the routers and other such components which host the cloud infrastructure would generally not be able to properly route the packets to the appropriate destination(s), since the customer routing information (e.g., embodied by 402) is only meaningful to the customer's overlay network and not the physical networking infrastructure to which the cloud host resources are connected. In the encapsulated packet 420, the IP$_v$ and TCP$_o$, combined with the payload of the original customer packet, function as a new payload field.

In some embodiments, any customer packet being received to a device in the cloud can be encapsulated to include this physical routing information to be used within the cloud. Since the first device to receive a packet in the cloud can be considered to be on the "edge" of the cloud, these devices will be referred to herein as "edge" devices. An "edge" device as used herein can refer to any device in hardware and/or software capable of receiving a packet of information from outside the cloud, and/or capable of transmitting a packet of information from inside the cloud. The encapsulation process can happen at any appropriate edge device in some embodiments, while in other embodiments the edge devices can route the packets to an encapsulation component or other device capable of encapsulating or decapsulating the packets. As should be understood, when a packet is to be transmitted back to the customer network, or otherwise transmitted outside the cloud, a "decapsulation" process can be performed wherein the IP$_R$ 422 and opaque field 424 (or other such fields) are removed and the packet can be routed using the virtual address space information for the customer network. For purposes of simplicity the process of encapsulation will be discussed with respect to various embodiments, but it should be understood that a decapsulation process can also be performed using such components and processes in accordance with the various embodiments.

Certain conventional approaches perform a level of encapsulation on hardware such as host devices and servers. In these approaches, a central processor can perform the encapsulation procedure in order to route packets received to a network port, network interface card (NIC), or similar device. The encapsulation process in general is not exposed to the user. In some cases, the mapping information can be distributed from a centralized service to each appropriate node across the cloud.

Certain systems can provide access to resources for various users, while performing operations such as encapsulation, decapsulation, and stateful firewalling operations using components that are not exposed to the customer, guest OS, CPU on a provisioned host machine, or other such potential sources of manipulation.

One of the limitations in many conventional systems is that the physical transmission path or "wire" can only allow for relatively small packets of information, such as 1.5 KB or 9 KB packets. The use of smaller packets is not strictly a physical consideration, but is also results from historical and protocol definition reasons. For example, in modern networks where most or all links are switched and the transmission rates are high, this limitation could be increased by orders of magnitude without intolerably increasing collisions. Even though a physical network interface, such as a NIC, can only transmit or receive 1.5 KB or 9 KB packets, it is desirable in at least some embodiments to transmit larger packets from the DOM-U to the DOM-0 network stack and on to NIC, and have the NIC segment the larger packet into multiple 1.5 KB or 9 KB packets. Many commodity NICs support advanced functionality such segmentation offload to address the this requirement. A NIC with segmentation offload capabilities can be configured to receive and/or buffer relatively large packets, and segment or frame those larger packets into smaller packets or Ethernet frames that comply with the 1.5 KB, 9 KB, or other such size restriction. Devices (e.g., NICs) receiving these packets can be configured to reassemble the larger packets based on the plurality of smaller packets.

Many commodity NICs also provide advanced features such as TCP segmentation offload that can assist with high-speed networking. Systems and methods in accordance with various embodiments can take advantage of such features to provide for "virtual" networking, such as where a customer has access to a host device sitting between a customer address space and a provider network address space. Typically, segmentation offload functionality works only with well known level four ("L4") protocols such as TCP. When the packets are encapsulated such as described previously, the L4 protocol is changed to something other than TCP. Thus, segmentation offload features on the NIC are not able to work on such encapsulated packets. As used in the art for describing layers between the physical hardware ("level one") and an application miming on that hardware ("level seven"), level four refers to a "protocol" level, which in the case of Internet protocols can refer to protocols such as the Transmission Control Protocol (TCP) and User Datagram Protocol (UDP). Receive side TCP segment processing assumes that the TCP segment payload is entirely customer data (or other such data). Hence on the transmit side, encapsulation related metadata cannot be added to L4 payload in order to retain the original L4 header, as the addition of metadata would lead the receive side to corrupt packet payload with encapsulation/decapsulation metadata.

FIG. 4(a) illustrates an example of an original packet 400 that can be received from a user as discussed previously. This packet can include the payload (here a level four payload), along with an IP address (real or virtual, at level three in the network stack) and a TCP header (at level four). Using an encapsulation approach as discussed previously, a control host can attach a new address, such as a real address ($IP_R$) and other information such as another header, such as a fake header ($TCP_F$ or $UDP_F$, for example) for use in routing the packet (or frame) in the physical or secure network. The packet after encapsulation 420 can appear as illustrated in FIG. 4(b), for example, wherein the original virtual IP address, TCP (or UDP, etc.), and payload information now effectively form the level four payload, with $IP_R$ forming the level three address and $TCP_F$ (here, part of the opaque field) forming the level four protocol header. A conventional NIC or similar device, however, will not know how to properly split a 64K or similar packet according to the encapsulated frame, as the NIC will not be able to properly interpret the information now contained within the level four payload. Also, as discussed, the level four payload has changed by including the $IP_V$ and $TCP_O$ information.

Systems and methods in accordance with various embodiments provide a framework that can be implemented by conventional or other networking components, such as commodity NIC devices, that enable these components to provide such functionality while supporting multiple protocols, such as a variety of different standard and proprietary protocols. These commodity devices then can provide the enhanced performance and other advantages used for the conventional protocols of these devices, independent of the customer-specific format of the packets. A NIC vendor, for example, can implement a framework that enables the NIC to be used by a customer with any compliant protocol, without any customization or need for special hardware.

In one example, a NIC in a network environment can process TCP segments. The customer network might utilize packets of a size (e.g., 64K) that cannot typically be passed from the NIC out onto the network, as the NIC might only be able to transmit network packets on the order of 8K or 9K in size, for example (depending on network configuration and other such issues). As discussed above, technologies exist that allow larger packets to be segmented at the NIC into multiple Ethernet frames of the appropriate size (e.g., 1.5K or 9K, etc.). For example, TCP Segmentation Offload (TSO) and Receive Side Coalescing (RSC) can be used on the egress and ingress endpoints, respectively, to increase network throughput performance by enabling the host to deal with larger TCP segments (e.g., 64K in size). TSO is a technique for segmenting TCP packets into segments of the appropriate size for transmission over the network, and RSC enables these segments to be reassembled at the other side of the network. In general, however, techniques such as TSO and RSC are not supported for packets encapsulated with proprietary protocol information, such as the additional header information illustrated in FIG. 4(b). For example, packets that are encapsulated using a proprietary format are typically larger than TCP packets and do not have the anticipated TCP header information, such that the NIC will not recognize these encapsulated packets.

By implementing an appropriate framework, however, a NIC or other appropriate network component can have the ability and specifications to map the encapsulated packet to something that the component can understand as a TCP packet. Once a NIC recognizes the packet as a TCP packet, for example, the NIC can segment the packet, add the appropriate headers, and/or do any of the other things that a NIC typically would do for a conventional TCP packet. Even for packets encapsulated with any of a variety of different protocols, TSO and RSC can provide a significant improvement (e.g., up to an 80% performance boost) as well as other well established advantages. Further, by implementing a framework the NICs can not only be used with different protocols, but also can enable customers to upgrade or change protocols without having to purchase, upgrade, or modify their existing hardware.

FIG. 4(c) illustrates an exploded view of an example opaque field 400, such as could be used with the encapsulated packet 420 of FIG. 4(b). As discussed, the opaque field 440 can include any information utilized by the particular format or protocol of the customer network, such as GRE or other such protocols. The opaque field in at least some embodiments is a TCP- or UDP-based header, or other such protocol header. In this example the opaque header 440 has a first set of information 442 at a specified offset in the opaque field that indicates or identifies the particular format of the segment or packet. For example, the information can be a two-byte field that includes a value corresponding to a particular format. The network hardware can contain, or have access to, a mapping of values from the first offset value and the corresponding formats in order to determine, from the value of the first set of information, the appropriate format of the packet.

In this example, the opaque field also includes a second field of information 444 at a specified second offset in the opaque field 440. This second field 444 can be of an appropriate length, such as two bytes, and can include a value that specifies a flow identifier, or an identifier for a specific flow of traffic, as may be useful for desegmentation. In some embodiments, this field can identify a unique TCP flow (or other flows such as a UDP flow) along with a regular 5-tuple when performing a TSO or RSC operation on a particular format packet.

The examples in FIGS. 4(a)-4(c) can correspond to an environment for a specific protocol, for example, where the header has information such as the virtual network to which the packet belongs, the virtual machine from which the packet originated, and/or the virtual machine to which the packet is heading. This information will not change between packets within a common TCP stream. Slot IDs, or virtual machine identifiers, can be used for connection information since in a virtualized network environment, for example, there could be two different virtual machines on the same physical host that belong to two different virtual networks. Those virtual machines could have exactly the same IP address, and could potentially communicate with someone who happens to have the same port and IP address. From a TCP standpoint, the 5-tuple can be exactly the same. Other information such as source IP and destination IP, source port and target port, etc., can also be exactly the same. Thus, from a TCP standpoint the connections appear as the same connection, but could actually be in two different private networks. The use of slot IDs can uniquely separate these situations. For other protocols, values other than virtual machine identifiers can be used as should be apparent.

In one example, an encapsulated packet is received to a NIC. The NIC, using the specifications of the framework, can analyze the packet to identify that the packet is encapsulated and has to be handled differently than a conventional TCP or UDP packet. In one example, an encapsulated packet includes inner and outer IP headers, as illustrated in FIG. 4(b). The encapsulated packet also has an opaque field (that can appear as part of the payload as in FIG. 4(c)), which can be used for protocol-specific information. The length of the opaque field, and the information contained therein, can vary between embodiments. In order to identify the packet as being encapsulated, the outer IP header can contain pre-configured protocol information. Further, the packet can contain at least one two-byte field in the opaque field (although other sizes and locations can be used as well within the scope of other embodiments). The two-byte field can be a pre-configured distance from the start of the opaque field, and the value of the two-byte field also can be pre-configured. The combination of the protocol information in the outer IP header and the format information in the two-byte field of the opaque field can enable the NIC or another network component to recognize that the packet is encapsulated, as well as the format of the encapsulation. Since the NIC does not otherwise look at other information in the opaque header, the opaque header can include information specific to any particular protocol without affecting the processing of the packet by the NIC. The two bytes in the opaque header can identify a specific format of the packet, which can assist in determining the rules or policies for processing the packet. Based upon this the information in the outer IP header and opaque field, the NIC can analyze each received packet to determine whether the packet can be processed using conventional approaches or whether the packet is an encapsulated packet and should be processed according to special rules specified by the framework.

During a TSO process, for example, the segmentation of egress (e.g., outgoing) TCP segments can be performed using a standard algorithm on the TCP segment data starting at the inner IP header. The large encapsulated packet is segmented into a number of packets of a size enabling the segments to be transmitted over the network. In order for the framework to also work with stateless tunneling, the opaque field is copied verbatim to each of the resulting segmented TCP/IP packets, and placed between the inner and outer IP headers. The outer IP header is copied to each resultant packet and appropriate adjustments, such as a change to the "length" information, can be made using the same logic applied to the inner IP header. Further, an IP ID can be generated, which is part of the IP header, along with a checksum for the IP header.

Similarly, during an RSC process TCP flows of the packets or segments having the special protocol format information are defined by the regular 5-tuple of the TCP ports, the inner IP addresses, the inner IP protocol field, and the inner L4 ports (e.g., TCP ports or UDP ports), as well as an additional two bytes at the pre-configured offset from the start of opaque field. It should be understood that TCP flows of the special format packets will not overlap with flows of regular packets. Further, it should be understood that terms such as "packets" are used throughout for purposes of simplicity of explanation, but at other locations or instances processes might involve objects more commonly referred to as segments or frames, and the common name for a single object might change between these and other terms at various points in the processes discussed herein.

RSC is performed using a conventional algorithm on the TCP packet data starting at the inner IP header. When coalescing the related TCP packets, the opaque field from the first TCP packet can be copied to the resultant TCP segment between the inner IP header and the outer IP header. The outer IP header of the resultant TCP segment can be coalesced the same way the inner IP header is coalesced. If there are restrictions on the IP flags (e.g., "Don't fragment" or "More bit") that force the ingress packets to be ineligible for RSC, the restrictions can be applied to IP flags both in the inner and outer IP headers.

RSC can maintain hash buckets (or other queues or temporary storage locations) for each connection for which packets are being received. When a TCP packet is received, the receiving device then can determine the connection to which the packet belongs, using information such as the IP and TCP information as well as sequence number bits in the outer TCP header, and can queue the packet to the appropriate hash bucket. For buckets where there are already packets, the network component can attempt to merge the segmented packets until the full packet has been coalesced. Conventional criteria can apply, such as sending the coalesced packet on to the operating system when the size reaches a certain threshold or the packets are queued for a specific length or range of time.

In at least some embodiments, however, the concept of a connection will differ from a connection for standard TCP packet processing. Instead of the conventional 5-tuple, mentioned above, connections will be determined based on a 6-tuple, which includes the standard TCP connection information of the 5-tuple along with the new piece of connection information identified in the two bytes of the opaque field. Once the network component figures out that the packet is to be processed using the special rules, the component uses the 6-tuple instead of the 5-tuple to figure out the connection information, and then executes the RSC process essentially the same as for conventional packets, to coalesce the packets, check the sequence numbers, etc.

In addition, RSC also in many cases needs to throw off the opaque bits of all but the one of the packets being coalesced, such as the first received packet in some embodiments. In some embodiments RSC may not be performed when the opaque fields do not match, such that the opaque fields from the other packets will not be discarded at least until those packets can be otherwise processed. After one copy of the opaque bits is received and stored (at least stored temporarily or cached, for example), opaque bits of all other packets to be coalesced that match the stored copy of the opaque field can be discarded by the NIC. Further, since the total length of the packet is changing during the merge the NIC will have to make appropriate adjustments to the checksum, IP header flags, or other such information, for both the outer IP and inner IP headers. In the opaque fields, and elsewhere, the byte counts and other aspects could also be changed. Apart from the two bytes (or n-bytes) of information used for identification, the expectation is that the rest of the opaque bits will be exactly the same for all packets within a particular TCP stream. In one protocol example, the opaque information could correspond to a specific network identifier. There also can be other information, such as a virtual machine identifier or slot ID, which will be the same for each packet in a TCP stream. In particular, the n-bytes can identify the packet as corresponding to a particular virtual machine.

In many embodiments, the framework relies upon specific pre-configured values. For example, as discussed above, the framework can rely upon a pre-configured length of the opaque field, as well as an IP protocol value that identifies specific or special formats for the received packets. The length of the opaque field in some embodiments corresponds to the length of the header for the special format of the packet. The IP protocol value could be any appropriate identifier for a specific protocol. The framework can expect that the offset of the n-byte field in the opaque field that identifies the format is pre-configured. In some embodiments, this can correspond to a specific port value.

The specific pre-configured values of the opaque field can vary for certain protocols. For example, the length of the opaque field for GRE support can be 16 bytes in one embodiment, with the IP protocol value that identifies a specific packet or segment format set to a value such as 47. The offset value that identifies a unique flow can be set to a value such as 10 to point to a part of a 'key' field or other such value.

In the case of an example protocol, the length of the opaque field might match the length of a protocol-specific header, with a value such as 20. The IP protocol value that identifies packets or segments of a particular protocol can be set to the IANA protocol number for UDP, for example, with a value such as 17. The offset value in the opaque field that identifies packets or segments of a particular format can rely at least in part upon the specific UDP port used, such as a UDP destination port with a value 2. The value of the field that identifies a unique flow when performing TSO or RSC can specify the source slot and target slot IDs along with the regular connection 5-tuple to identify a unique TCP flow. It should be understood that similar approaches can be used to determine values for other protocols within the scope of the various embodiments.

Figure 5:
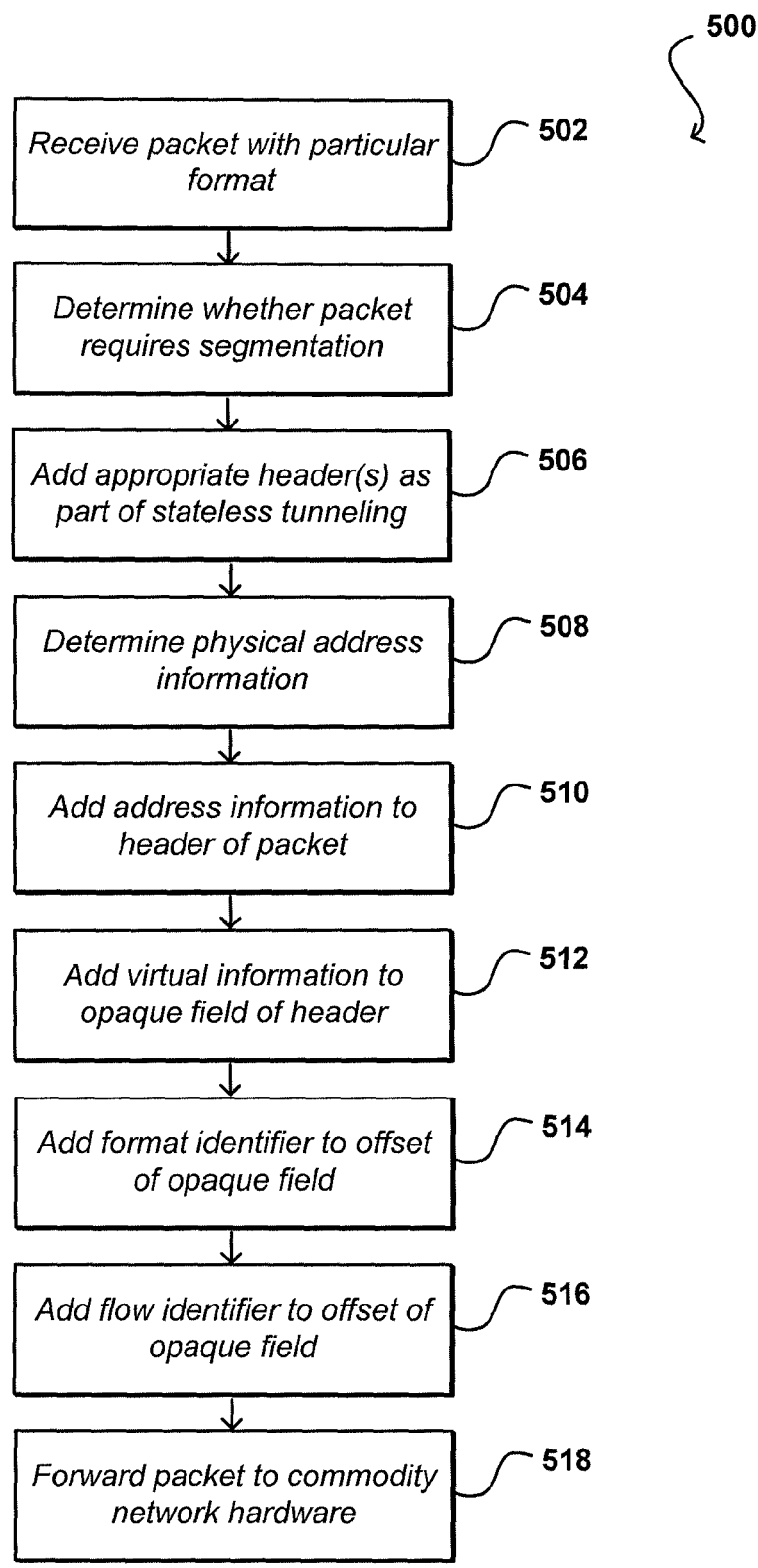
FIG. 5 illustrates an example of a first process for processing packets that can be used in accordance with various embodiment.

FIG. 5 illustrates an example of a packet management process 500 that can be used with a virtualized environment in accordance with various embodiments. In this example, a packet is received that includes virtual address information of a particular format 502. The received packet can be larger than the maximum size that can be transferred across a network using conventional networking hardware, and a determination is made as to whether the packet requires segmentation 504. One or more appropriate headers (e.g., an outer IP and opaque header) are added as part of a stateless tunneling process 506. Address information for the packet can be determined 508, such as by contacting a mapping service to determine physical address information that corresponds to the virtual address information. Address information can be added to the received message 510, such as to a header (such as an $IP_R$ section), where the address information corresponds to the physical address to which the packet is to be directed. The virtual address information can be added to a protocol header, such as a TCP header or other opaque field, for the packet 512. A first field of information can be added at a first predetermined offset within the opaque field, where the first field indicates a value identifying a particular format of the packet 514. A second field of information can be added at a second predetermined offset within the opaque field, where the second field identifies a particular flow or grouping of information 516. The information can be added to the opaque field without modifying the payload, such that the packet can be routed, segmented, and otherwise processed by commodity hardware. Other information, such as a virtual network identifier, can be added to the opaque header as appropriate. After updating the header information, the encapsulated packet can be transmitted to the NIC 518.

Figure 6:
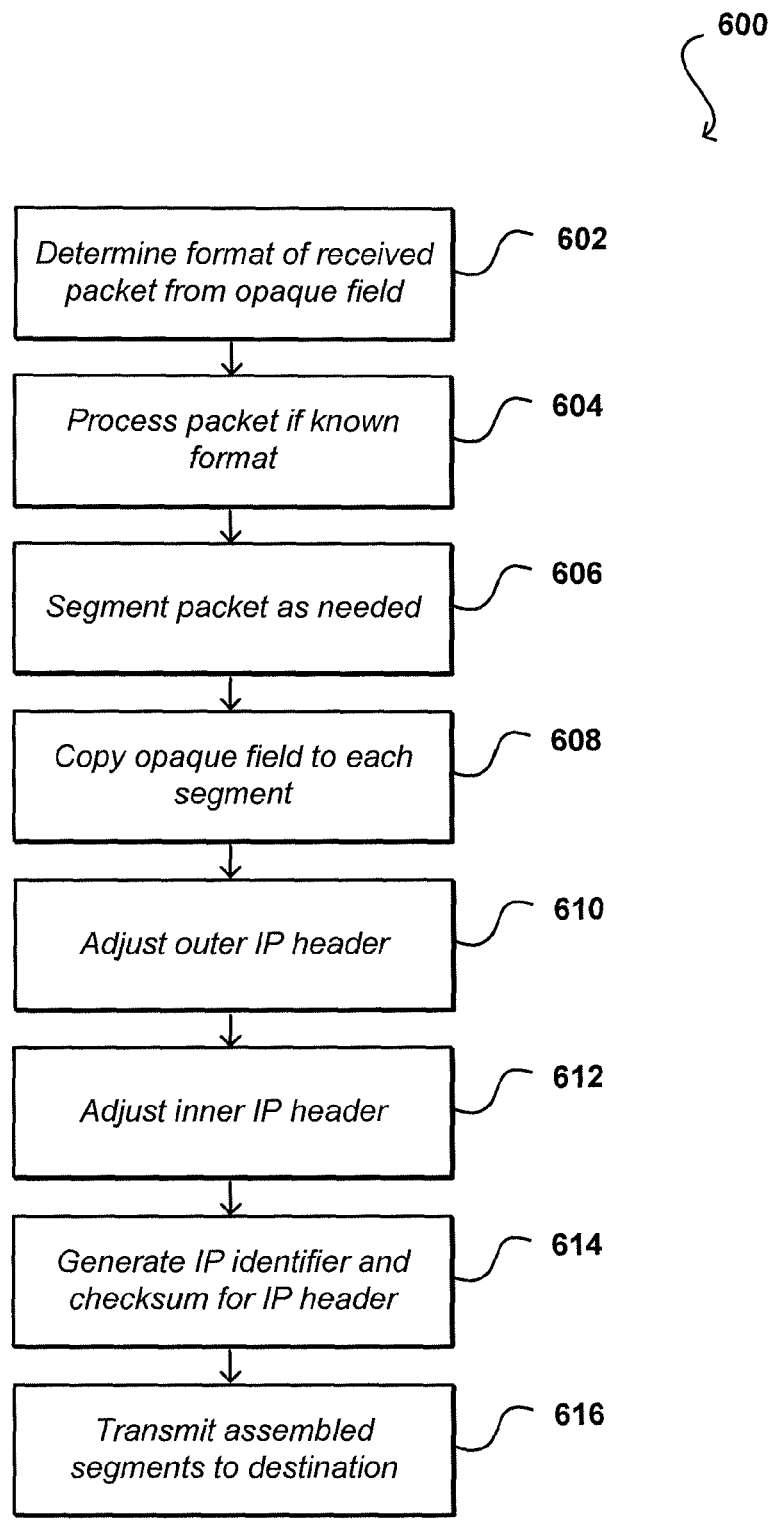
FIG. 6 illustrates an example of a second process for processing packets that can be used in accordance with various embodiments.

FIG. 6 illustrates a second process 600 that can be used to perform a TSO or similar operation on a packet in accordance with various embodiments. When the packet is received to the NIC, or another appropriate networking component, the NIC can utilize an appropriate framework to look to the value of the outer IP header and/or first field of information and determine a format of the packet 602. If the packet is determined to be a TCP-based packet, or packet of a known protocol that has segmentation offload support on the network device 604, the NIC can perform segmentation offload functionality for the egress (e.g., outgoing) segments using a standard algorithm on the segment data starting at the inner IP header. The NIC can also determine whether the packet is encapsulated and special rules need to be applied. The large encapsulated packet is segmented into a number of packets of a size enabling the segments to be transmitted over the network 606. The opaque field can be copied verbatim to each of the resulting segmented packets 608, being placed between the inner and outer IP headers in some embodiments. The outer IP header 610 copied to each segmented packet and appropriate adjustments, such as a change to the length information, can be made using the same logic applied to the inner IP header 612. An IP identifier can be generated, which is part of the IP header, along with a checksum for the IP header 614. The packet segments then can be transmitted over the network to the physical destination address 616. As should be apparent similar functionality can be used to process packets received from a physical address space, wherein mapping information is determined for the packet and virtual address information is added to the packet. Further, it should be understood for the various processes described herein that there can be additional, fewer, or alternative steps performed in similar or alternative orders, or in parallel, within the scope of the various embodiments unless otherwise stated.

Figure 7:
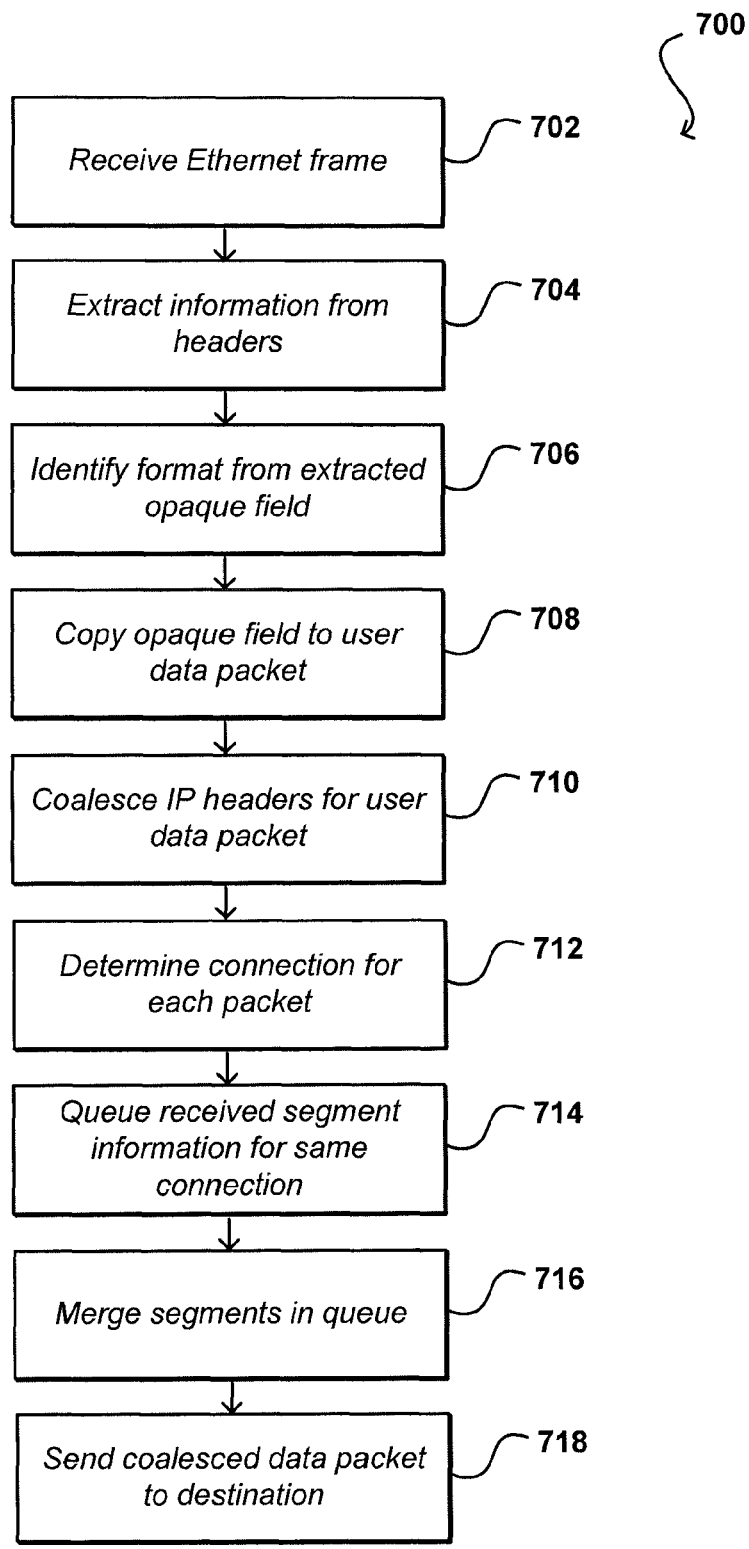
FIG. 7 illustrates an example of a third process for processing packets that can be used in accordance with various embodiments.

FIG. 7 illustrates an example of an RSC process 700 that can handle packets transmitted using a TSO process such as that described with respect to FIG. 6. In this example, an Ethernet frame is received to a physical network interface (e.g., a NIC), where the frame includes physical address information 702. The NIC can utilize an appropriate framework to extract and identify information from the frame useful for transmission and coalescing 704, such as the regular 5-tuple of the TCP ports, the inner IP addresses, and the inner IP protocol field, and the additional bytes at the pre-configured offset from the start of the opaque field. Once the format of the Ethernet frame is identified from the information in the opaque header 706, a process such as RSC can be performed using a conventional algorithm on the packet data starting at the inner IP header. The algorithm can copy the opaque field from at least one of the received packets, such as the first received packet, to the resultant coalesced packet between the inner IP header and the outer IP header 708. If the opaque fields do not match, the opaque fields for the non-matching packets can be retained for further processing in at least some embodiments. The outer IP header of the resultant segment can be coalesced the same way the inner IP header is coalesced 710. If there are restrictions on the IP flags (e.g., "Don't fragment" or "More bit") that force the ingress packets to be ineligible for RSC, however, the restrictions can be applied to IP flags both in the inner and outer IP headers. RSC can determine the connection for each received packet 712, such as by analyzing the information in the opaque header and/or the IP headers, and can queue the received related packets to the appropriate hash bucket 714. For buckets where there are already packets, the network component can attempt to merge the segmented packets until the full packet has been coalesced 716. When at least one specified criterion is reached, such as a full packet being coalesced, the coalesced packet being a certain size, or the packets being queued for a period of time, the coalesced packet can be sent on to the physical destination address 718, such as the operating system of the receiving device. As mentioned previously, the RSC can be performed by commodity NICs that support Receive Side Coalescing, since the packet format follows all TCP format rules and the TCP payload is exactly the same as customer packet's payload. When the packets are received, a desegmentation process can occur as with conventional systems.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for segmenting encapsulated data packets in an electronic environment, comprising:
   under control of one or more computer systems configured with executable instructions,
   receiving a data packet to a networking device, the data packet including a payload portion and header information, the header information including an opaque field having a protocol identifier value located at a particular offset position within the opaque field;
   utilizing a framework with the networking device to recognize a type of the data packet based at least in part upon the protocol identifier value, the type of data packet not being otherwise recognized by the networking device; and
   if the protocol identifier value is a recognized protocol identifier to the framework,
      generating a plurality of transmission segments utilizing a conventional segmentation algorithm;
      replicating an inner header, an outer header, and the opaque field to a header of each of the plurality of transmission segments to form a full encapsulated header for each transmission segment;
      adjusting the full encapsulated header for each transmission segment based at least in part upon the opaque field; and
      transmitting the plurality of transmission segments through the framework to a destination.

2. The computer-implemented method of claim 1, wherein the opaque field includes a flow identifier as a second offset value for each of the plurality of transmission segments,
   wherein a networking device receiving the plurality of transmission segments is able to identify the plurality of transmission segments as being related to a common flow.

3. The computer-implemented method of claim 1, wherein the data packet is larger than an allowable size that can be transmitted to the destination by the networking device.

4. The computer-implemented method of claim 1, wherein the type of the data packet corresponds to a stateless tunneling protocol used to transmit the data packet.

5. The computer-implemented method of claim 1, wherein the outer header is a protocol field containing pre-configured protocol information.

6. The computer-implemented method of claim 5, wherein the opaque field further includes protocol information at a pre-configured offset.

7. The computer-implemented method of claim 6, wherein the protocol field and the protocol information at the pre-configured offset determine at least one rule or policy to be used by the networking device in processing the data packet.

8. The computer-implemented method of claim 1, wherein the networking device is a network interface card (NIC).

9. The computer-implemented method of claim 1, wherein the opaque field further includes slot information identifying a virtual machine for the data packet.

10. A computer-implemented method for coalescing segments of encapsulated data in an electronic environment, comprising:
    under control of one or more computer systems configured with executable instructions,
    receiving a plurality of data segments to a networking device, each data segment including a payload portion and a full encapsulated header having header information, the header information including an opaque field having opaque information that includes a protocol identifier value located at a first particular offset position within the opaque field and a flow identifier value located at a second particular offset position within the opaque field;
    utilizing a framework with the networking device to recognize a type of each data segment, based at least in part upon
       a protocol field containing pre-configured protocol information and protocol information at a pre-configured offset of the opaque field, and
       a flow to which each data segment belongs, based at least in part upon the flow identifier value, the type of data segment not being otherwise recognized by the networking device; and
    if the protocol field and the protocol information at the pre-configured offset are recognized by the framework:
       writing a packet payload portion and the header information for a first received data segment of an identified flow to a temporary storage area;
       for each subsequently received data segment for the identified flow that at least meets at least one coalescing criterion, coalescing a subsequent packet payload portion with the packet payload portion to form a data packet and discarding the opaque information and an outer protocol header from the subsequently received data segment, the coalescing being performed using a standard networking coalescing mechanism; and after coalescing the plurality of data segments, forwarding the data packet to a destination identified by the header information.

11. The computer-implemented method of claim 10, wherein the data packet is larger than an allowable size that can be received to the networking device.

12. The computer-implemented method of claim 10, wherein a type of the data packet corresponds to a stateless tunneling protocol used to transmit the data packet.

13. The computer-implemented method of claim 10, wherein the protocol field and the protocol information determine at least one rule or policy to be used by the networking device in processing the plurality of data segments.

14. The computer-implemented method of claim 10, wherein the networking device is a network interface card (NIC).

15. The computer-implemented method of claim 10, wherein the networking device is operable to process the data packet using one of a conventional receive side coalescing (RSC) or TCP segmentation offload (TSO) algorithm.

16. A computer-implemented method of enabling protocol-specific data packets to be processed by a commodity networking device, comprising:
under control of one or more computer systems configured with executable instructions,
receiving a payload for a data packet;
adding an opaque field to header information for the data packet to generate a full encapsulated header, the header information including a replicated inner and a replicated outer header useful for stateless tunneling, the opaque field including at a particular offset value within the opaque field a flow identifier and a protocol field identifying a protocol for the stateless tunneling; and
forwarding the data packet to a network device,
wherein the network device is operable to use a framework to determine a type of the data packet based at least in part upon protocol information and the protocol field in the data packet and process the data packet using a conventional algorithm and any special rule or policy specified for the stateless tunneling protocol via the framework, the type of the data packet not being otherwise recognized by the framework.

17. The computer-implemented method of claim 16, wherein the network device is operable to process the data packet using one of a conventional receive side coalescing (RSC) or TCP segmentation offload (TSO) algorithm.

18. The computer-implemented method of claim 16, wherein the opaque field further includes the protocol information.

19. A system for enabling protocol-specific data packets to be processed by a commodity networking device, comprising:
a processor; and
a memory device including instructions that, when executed by the processor, cause the processor to:
receive a payload for a data packet;
add an opaque field to header information for the data packet to generate a full encapsulated header, the header information including a replicated inner and a replication outer header useful for stateless tunneling, the opaque field including at a particular offset value within the opaque field, a flow identifier, and a protocol field identifying a protocol for the stateless tunneling; and
forward the data packet to a network device,
wherein the network device is operable to
use a framework to determine a type of the data packet based at least in part upon protocol information and the protocol field in the data packet, and
process the data packet using a conventional algorithm and any special rule or policy specified for the protocol for the stateless tunneling via the framework, the type of the data packet not being otherwise recognized by the framework.

20. The system of claim 19, wherein the network device is operable to process the data packet using one of a conventional receive side coalescing (RSC) or TCP segmentation offload (TSO) algorithm.

21. The system of claim 19, wherein the protocol field and the protocol information determine at least one rule or policy to be used by the network device in processing the data packet.

22. A non-transitory computer readable storage medium storing instructions for enabling protocol-specific data packets to be processed by a commodity networking device, the instructions when executed by a processor causing the processor to:
receive a payload for a data packet;
add an opaque field to header information for the data packet to generate a full encapsulated header, the header information including a replicated inner and a replicated outer header useful for stateless tunneling, the opaque field including at a particular offset value within the opaque field a flow identifier and a protocol field identifying a protocol for the stateless tunneling; and
forward the data packet to a network device,
wherein the network device is operable to use a framework to determine a type of the data packet based at least in part upon protocol information and the protocol field in the data packet and process the data packet using a conventional algorithm and any special rule or policy specified for the stateless tunneling protocol via the framework, the type of the data packet not being otherwise recognized by the framework.

23. The non-transitory computer readable storage medium of claim 22, wherein the network device is operable to process the data packet using one of a conventional receive side coalescing (RSC) or TCP segmentation offload (TSO) algorithm.

24. The non-transitory computer readable storage medium of claim 22, wherein the protocol field and the protocol information from the data packet determine at least one rule or policy to be used by the network device in processing the data packet.

* * * * *